May 11, 1948. R. H. MORGAN ET AL 2,441,324
RADIATION RESPONSIVE SYSTEM
Filed May 15, 1946 3 Sheets-Sheet 1

Inventors
Russell H. Morgan
Paul. C. Hodges

Attorneys

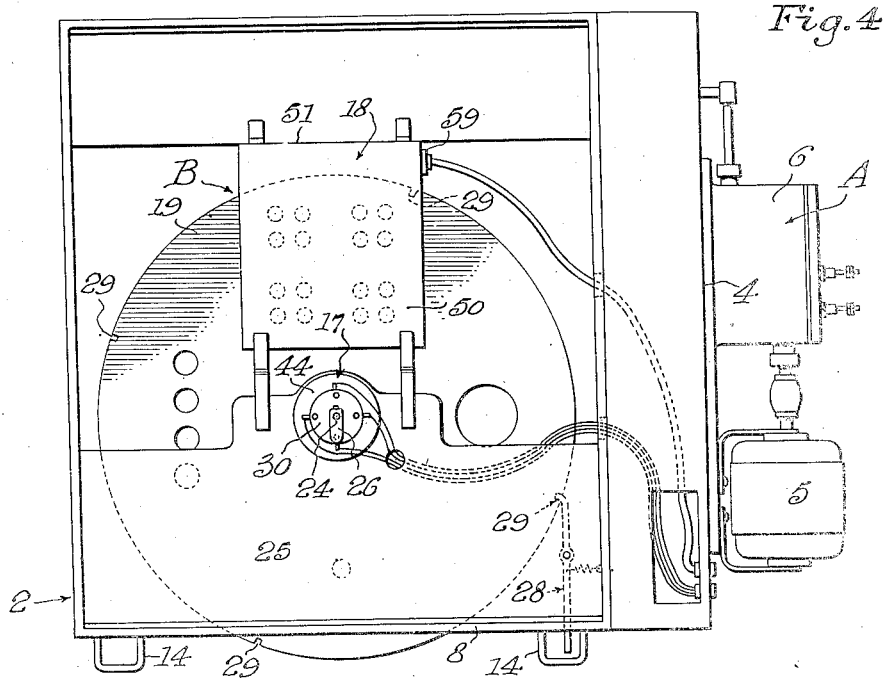
Fig. 4.
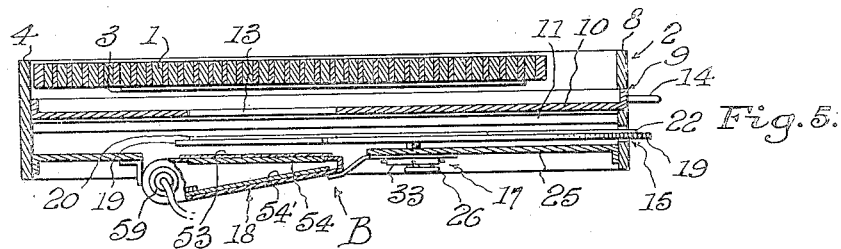
Fig. 5.
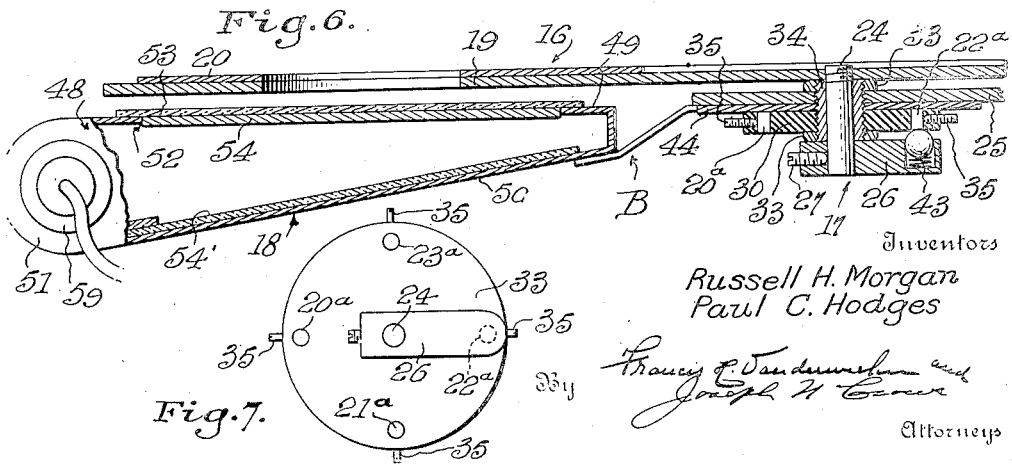
Fig. 6.
Fig. 7.
Inventors
Russell H. Morgan
Paul C. Hodges
Attorneys May 11, 1948.　　　R. H. MORGAN ET AL　　　2,441,324
RADIATION RESPONSIVE SYSTEM
Filed May 15, 1946　　　3 Sheets-Sheet 3
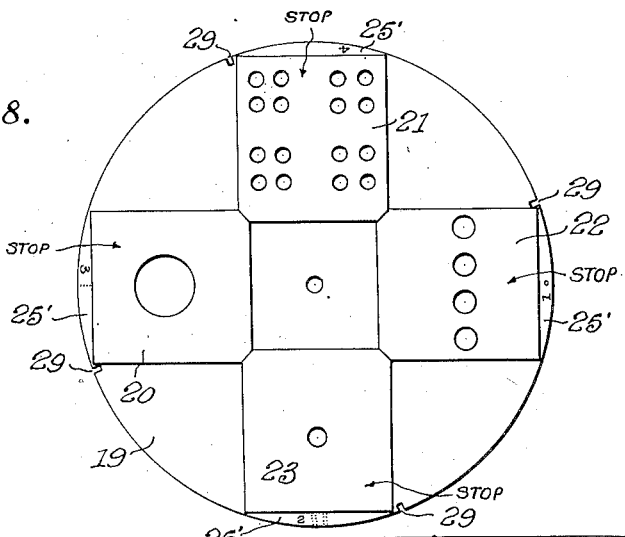
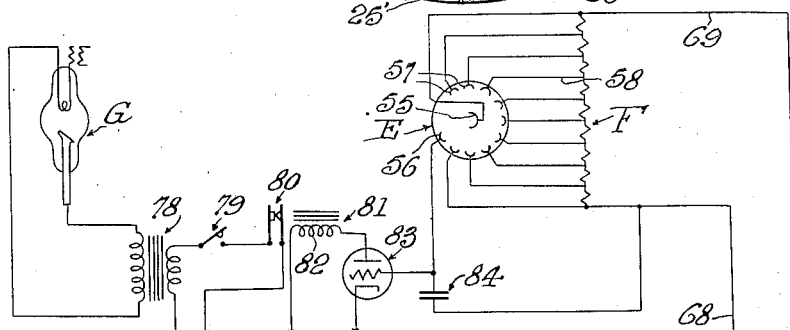
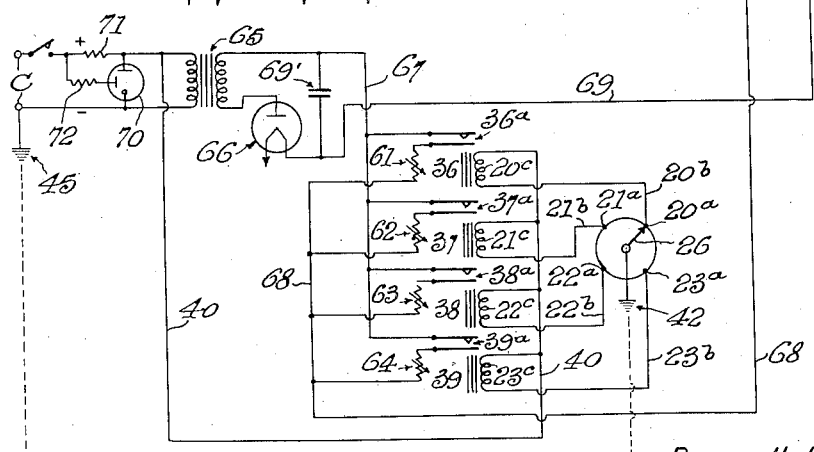
Inventors
Russell H. Morgan
Paul C. Hodges
By
Attorneys Patented May 11, 1948

2,441,324

UNITED STATES PATENT OFFICE 2,441,324

RADIATION RESPONSIVE SYSTEM

Russell H. Morgan and Paul C. Hodges, Chicago, Ill., assignors to United States of America as represented by the Secretary of War Application May 15, 1946, Serial No. 669,818

6 Claims. (Cl. 250—95)

1

This invention generically relates to a photoelectric timing mechanism, more especially it is directed to a radiation responsive unit adapted to be used in connection with an automatic phototimer of the type forming the subject matter of our Patent 2,401,289, entitled "Photoelectric timer for Roentgen photography".

One of the basic objects of this invention is to improve the diagnostic quality of films produced through the instrumentality of automatic phototimers by providing a radiation responsive unit embodying an occulting assembly, a distributor mechanism and a radiation detector operatively associated for the purpose of limiting radiation at the incident surface of the radiation detector to the rays passing through the region of interest of the anatomical structure under examination.

Another object of this invention is to provide a radiation responsive unit including an occulting assembly, a distributing mechanism and a radiation detector combined in a manner to enable variation of the radiation at the incident surface of the radiation detector and at the same time to effect adjustment of the sensitivity of the phototube to compensate for such variation of incident radiation.

With these and other objects in view this invention consists of certain details of construction, combination and arrangement of parts to be more particularly hereinafter set forth and claimed.

Referring to the accompanying drawings in which corresponding parts are indicated by similar reference characters:

Figure 4 is a bottom plan view illustrating a Potter-Bucky grid construction, radiation detector, occulting or diaphragm assembly and distributor mechanism associated with the detector;

Figure 5 is a transverse vertical section taken on the line 5—5 of Figure 4;

Figure 6 is a fragmentary vertical section partially in elevation illustrating the radiation detector and the associated occulting or diaphragm assembly and selector mechanism;

Figure 7 is a bottom plan view of the circular plate distributor arm and contact buttons forming part of the occulting assembly and selector mechanism;

Figure 1:
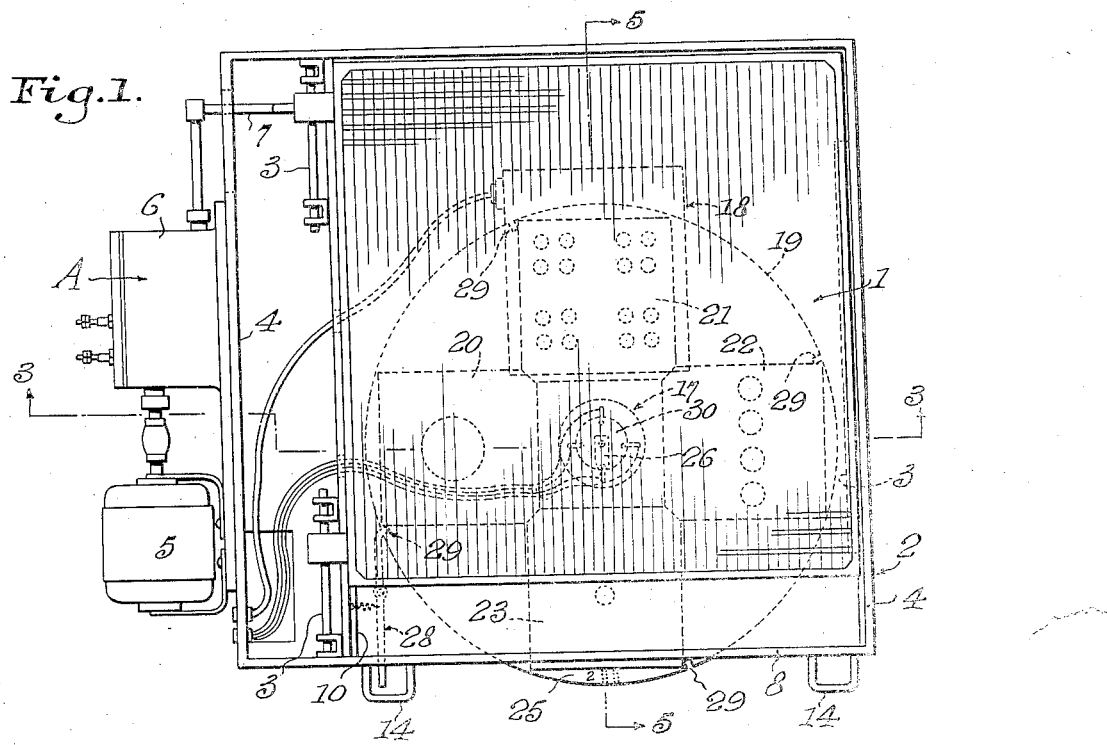
Figure 1 is a top plan view of a Potter-Bucky grid construction of a reciprocatory type and the radiation responsive unit attached to the base of the grid construction.
Figure 2:
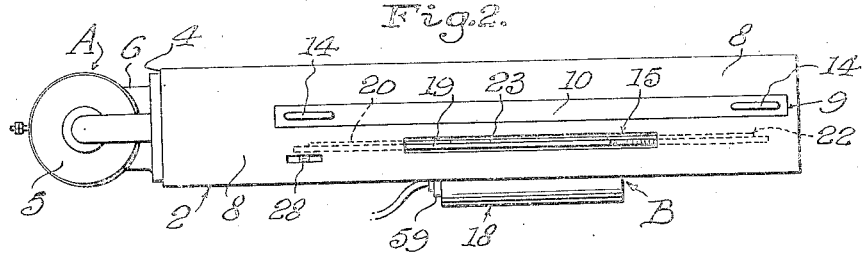
Figure 2 is an end view of the structure shown in Figure 1.

Figure 8 is a top plan view of the apertured disc forming part of the occulting assembly and selector mechanism; and Figure 9 is a simplified circuit diagram of an automatic phototiming mechanism including a phototube of the multiplier type, a condenser-thyratron-relay system controlled by the utilization circuit of the multiplier tube and illustrating the electrical relation of the distributor mechanism with the various resistors employed for controlling the sensitivity of the multiplier tube.

In the automatic phototiming mechanism forming the subject matter of the above referred to pending application (which fundamentally comprises a radiation detector unit and a condenser-thyratron-relay system) when Roentgen rays fall on the fluorescent screen of the detector unit, it emits visible light which causes the multiplier tube to generate a small electrical current. The magnitude of this current is proportional to the light emitted by the fluorescent screen and therefore to the intensity of the Roentgen rays that induce the visible radiation. This photo current enters the condenser-thyratron-relay system where it is collected by the condenser in the utilization circuit of the phototube and when the charge on this condenser reaches a critical value the thyratron system ionizes and activates a normally closed relay which in turn interrupts the Roentgen ray exposure.

The time required for charging of the condenser determines the length of the exposure and varies with the voltage applied to the phototube, the size of the condenser and intensity of the radiation reaching the detector. The first two factors are fixed at the time the instrument is calibrated leaving only the third factor variable depending upon the output of the Roentgen tube and the thickness and density of the anatomical structure under examination. All else being equal, the thicker the anatomical structure the lower will be the intensity of the light emitted by the fluorescent screen and therefore the longer the time for charging the condenser and the longer the Roentgen exposure. Under these conditions it has been found that better results would be obtained if the rays incident at the sensitive surface of the radiation detector were diaphragmed to limit the incident rays to those passing through the region of interest of the anatomical structure.

Experience with the 2 x 2 inch radiation responsive surface of the detector of the exposure meter forming the subject matter of our Patent 2,401,288 has shown that for some phases of Roentgenography such a surface is too small and for others it is too large. The small surface serves well for the skull, knee, shoulder and gall bladder but is too small for the trunk and pelvis and too large for the hand and wrist. For trunk and pelvic Roentgenography a larger detector gives better results by minimizing the effects of local areas of decreased density such as pockets of gas in the bowel; but such large detectors fail in the case of the gall bladder, knee, etc., because they are influenced by radiation passing around, as well as through, the region of interest. For the same reason the hand and wrist require very small detectors.

To meet this situation the incident invention occulters the radiation in its passage from the film to the fluoroscopic screen of the detector so as to vary the radiation incident at this surface of the screen in accordance with the anatomical structure under examination. At the same time the sensitivity of the phototube is adjusted to compensate in tube sensitivity for the differently irradiated areas of the screen and the consequent increase or decrease in visible light emitted by the screen.

To accomplish this a series of lead sheets are mounted on a rotatable steel disc, the respective sheets and the discs being formed with openings differing in size and in number, the rotary disc being operable to position a selected stop above and central of the fluoroscopic screen and beneath an opening in the film tray. These stops limiting the radiation passing from the film to the screen thus provide in effect a plurality of differently dimensioned detectors which may be selectively used dependent upon the particular anatomical structure under examination. As the selected stop is brought into position the distributor mechanism automatically effects adjustment of tube sensitivity to conform to the increase or decrease in screen response.

Figure 3:
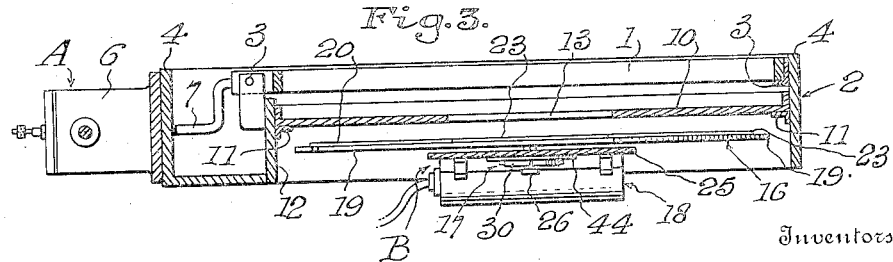
Figure 3 is a transverse vertical section taken on the line 3—3 of Figure 1.

In the illustrated embodiment characterizing this invention there is shown a Potter-Bucky reciprocating grid 1 slidably positioned in grid mounting 2 on guides 3. To impart reciprocatory movement to grid 1 there is attached to one of the side members 4 of the grid mounting 2 a mechanism A including motor 5 in operating relation with a reciprocating apparatus 6 operatively connected with grid 1 through link connection 7 as shown in Fig. 1 of the drawings. Mechanism A and its associated parts are fully described in our pending application entitled "X-ray apparatus," Serial No. 495,690, filed July 22, 1943. The front member 8 of mounting 2 is formed with a longitudinally extending slot 9 to receive film tray 10 adapted to be slidably supported on parallel guides 11 attached to one of the side members 4 of mounting 2 and to an upright 12 within said mounting, as shown in Fig. 3 of the drawings. Film tray 10 is formed centrally with a rectangularly shaped opening 13 and also with handles 14 to facilitate movement of the tray into and out of the grid mounting. Beneath slot 9 in front member 8 of the grid mounting there is formed another longitudinally extending slot 15 to permit protrusion of a segment of the dialing disc hereinafter to be referred to.

Within grid mounting 2 beneath film tray 10 is positioned radiation responsive unit B, which includes occulting assembly 16, distributing mechanism 17 and radiation detector 18 shown in Fig. 3 of the drawings. Occulting assembly 16 comprises a steel dialing disc 19 to the upper surface of which there is cemented four lead sheets 20, 21, 22 and 23 which hereinafter will be referred to as "stops." Stop 20 is centrally formed with a two inch circular aperture in registration with a similarly dimensioned opening in disc 19 and is employed for radiographing skull, gall bladder, shoulder, knee, etc. Stop 21 which is adapted to be used for radiographing the chest, abdomen and pelvis is formed with sixteen apertures half an inch in diameter located four in each corner of the stop thus leaving vertical and transverse bands between the openings. This arrangement distributes sampling over a wide area. Stop 22 is employed primarily for lateral radiography of the spine and may be used with cassettes of any size. Stop 23 is to be utilized for radiographing the hands, wrists, fingers and toes. It is formed with a single opening one-half inch in diameter, as shown in Fig. 8 of the drawings. When these stops are positioned intermediate the film and the fluoroscopic screen the radiation incident at the surface of the screen will be limited to that passing through the openings in the respective stops as will be understood without further discussion.

The preceding occulting assembly is affixed to the upper end of shaft 24 rotatably mounted in bottom plate 25 of grid mounting 2 as shown in Fig. 4 of the drawings. The lower or free end of shaft 24 carries a metallic distributing arm 26 which is affixed to the shaft by a locking pin 27 shown in Fig. 6 of the drawings. A suitably mounted spring catch 28 cooperating with the four notches 29 formed in the periphery of dialing disc 19, registers each of the stops precisely above the fluoroscopic screen of the radiation detector 18 as shown in Fig. 6 of the drawings.

The distributing mechanism 17 consists of a circular Bakelite plate 30 equipped with four metallic stationary contacts 20a, 21a, 22a and 23a spaced 90° apart as shown in Fig. 9 of the drawings. Bakelite plate 30 is clamped to bottom plate 25 of grid mounting 2 by nuts 33 positioned on the extremities of bushing 34 shown in Fig. 6 of the drawings. Stationary contacts 20a, 21a, 22a and 23a are secured in position by metallic pins 35 in electrical contact with conductors 20b, 21b, 22b and 23b, as shown in Fig. 9 of the drawings. The free ends of these conductors are connected to coils 20c, 21c, 22c and 23c of relays 36, 37, 38 and 39. The free ends of coils 20c, 21c, 22c and 23c are connected to conductor 40 extending from one side of a 110 volt A. C. source of electrical energy C. A thin sheet of fiber 44 interposed between the Bakelite plate and the bottom of plate 25 of grid mounting 2 insulates the distributing and occulting assembly as will be understood without further discussion. Shaft 24, bushing 34 and distributing arm 26 are in electrical contact with the metallic grid mounting 2 which is grounded as at 42.

Distributing arm 26 is provided at its outer end with a seat in which is positioned spring-pressed ball contact 43 adapted to engage and distribute ground to stationary contacts 20a to 23a, inclusive, depending upon the particular stop that is centered over the fluoroscopic screen of the detector. To enable the desired stop to be positioned over the screen, segments 25' of the dialing disc 19, which are adapted to protrude through the opening 15 in the grid mounting 2, are provided with appropriate numerals and suitable symbols as shown in Fig. 8 of the drawings.

When the ball contact of distributing arm 26 is in engagement with stationary contact 20a, relay coil 20c will be in electrical relation with the 110 volt source of A. C. through conductor 40 and grounds 42 and 45, whereupon relay 36 of the four relays 36 to 39, inclusive, will be energized to close contacts 36a of the four normally open relay contacts 36a to 39a, inclusive.

Radiation detector 13 comprises a housing 48 which includes horizontal top section 49, bottom section 50 which is inclined with respect to the top section and a cylindrically-shaped end section 51 as shown in Fig. 6 of the drawings.

Top section 48 is formed with opening 52 adapted to be closed by cover plate 53 carrying a fluoroscopic screen 54. On the inclined bottom section 50 there is disposed an aluminum mirror 54' serving to direct obliquely a mirrored image of the screen upon the active surface of phototube E positioned within the cylindrical section 51 of the housing as shown in Fig. 6.

Phototube E is of the multiplier type the construction and operation of which is described in detail in our Patent 2,401,289, entitled "Photoelectric timer for Roentgen photography." Briefly stated, phototube E embodies cathode 55, anode 56 and a series of electrodes or dynodes 57 which are in electrical relation with the phototube resistor network F as shown in Fig. 9 of the drawings. Resistor network F and the conductors extending from the electrodes of the phototube to said resistor are incased in a suitable housing 59 encircling the tube as shown in Fig. 6 of the drawings.

Potentials for the various electrodes of multiplier tube E are obtained from the 110 volt source C and supplied to the phototube through transformer 65, rectifier tube 66, conductors 67, 68 and 69, condenser 69', variable resistors 61 to 64, inclusive, and resistor network F. These potentials are stabilized against fluctuation in line voltage by gas triode 70 and the resistor network 71, 72, as shown in Fig. 9 of the drawings. The four variable resistors 61 to 64, inclusive, control the secondary electron emission of the phototube and thus control its sensitivity. These resistors 61 to 64, inclusive, are calibrated in terms of film speed so that the sensitivity of the phototube is adjusted for different film speeds by the setting of the variable resistor and also by the resistor selected by the distributor mechanism as the desired stop is operatively positioned above the fluoroscopic screen of the radiation detector.

An X-ray tube G of any suitable construction is adapted to be operatively positioned above grid mounting 2 so that when said X-ray tube is energized, its radiation, after being filtered of undesired scattered components by the reciprocatory grid 1, will pass through the film in the film tray 10, the opening in the bottom of the tray and the opening or openings in the selective stop and impinge the fluoroscopic screen of the radiation detector as will be understood without further discussion. X-ray tube G is energized through the transformer 78, the primary coil of which is in series with a suitable source of A. C. potential. The circuit of the primary coil of transformer 78 includes an exposure switch 79 (which when closed energizes the X-ray tube G) and normally closed contacts 80 adapted to be controlled by relay 81, the coil 82 of which is in series with the plate circuit of thyratron 83. Assuming the X-ray tube to be energized the phototube in response to the radiation incident at the surface of the fluoroscopic screen conducts a small current whose magnitude is proportional to the radiation intensity effective in exposing the film. The current from the phototube charges condenser 84 until the potential on the condenser reaches a predetermined level at which the thyratron 83 is rendered conductive, coil 82 of relay 81 energized and contacts 80 opened thus terminating the exposure. By use of the correct stop, adjustment of the sensitivity of the phototube for the selected stop and adjustment of the potential at which the thyratron ionizes, the phototimer can be made to terminate the exposure at exactly the instant at which the optimum diagnostic quality of the film occurs.

Automatic adjustment of phototube sensitivity for each of the stops 20 to 23, inclusive, is provided by the distributing mechanism which functions simultaneously with the occulting assembly to select one of the phototube control resistors 61 to 64, inclusive, the resistor selection made by the distributing mechanism being determined by the stop operatively positioned with respect to the fluoroscopic screen of the radiation detector. For instance, when stop 20 is brought into operative position relative to screen 54 of the radiation detector, as shown in Fig. 6, contact 43 of distributing arm 26 engages stationary contact 20a, and energizes coil 20c of relay 36. Energization of this coil closes normally opened contacts 36a and connects variable resistor 61 of the group 61 to 64, inclusive, in series with the plate circuit of rectifier tube 66 by which potential is supplied to phototube E as shown in Fig. 9 of the drawings. Resistor 61 which controls the sensitivity of phototube E imparts the proper sensitivity to the phototube required for stop 20. Thus, as each stop is successively brought into operative position with respect to the screen of the radiation detector the distributing mechanism simultaneously selects the proper variable resistance for phototube E, to the end that the response of the radiation responsive unit will parallel that of the Roentgen film exposed with or without intensifying screens through the complete range of radiation quality used in medical Roentgenography.

Manifestly, many changes and modifications in the radiation responsive unit forming the subject matter of the instant application will be apparent to those skilled in the art. For this reason the preceding description is intended to be descriptive only and the scope of the invention is to be limited only as required by the following claims.

Having thus described our invention what we claim as new and wish to secure by Letters Patent is:

1. A radiation responsive system adapted to be used in connection with an apparatus for automatically taking Roentgenographs of proper exposure comprising in combination a source of Roentgen radiation, a radiation detector having a response proportional to the intensity of the radiation effective in exposing the Roentgen film, said detector being positioned to receive the radiation after it has traversed the Roentgen film and including a fluorescent screen and a photoelectric cell operatively disposed with respect to said screen, occulting means associated with said detector for varying the radiation incident at the surface of the screen and additional means controlled by the first-mentioned means for adjusting the sensitivity of the photoelectric cell in accordance with the variation of said incident radiation.

2. A radiation responsive system adapted to be used in connection with an apparatus for automatically taking Roentgenographs of proper exposure comprising in combination a source of Roentgen radiation, a radiation detector positioned to receive the radiation after it traverses the Roentgen film, the response of said detector being proportional to the intensity of the radiation effective in exposing the Roentgen film, said detector including a fluorescent screen and a photoelectric cell disposed to receive the light rays emitted by said screen, occulting means associated with said detector for varying the radiation incident at the surface of said screen, said occulting means including a stop adapted to be interposed between the Roentgen film and the screen and additional means coacting with and controlled by said occulting means for adjusting the response of the photoelectric cell in accordance with the increase or decrease in visible light emitted by said screen.

3. A radiation responsive system adapted to be used in connection with an apparatus for automatically taking Roentgenographs of proper exposure comprising in combination a source of Roentgen radiation, a radiation detector positioned to receive the radiation after it traverses the Roentgen film, the response of said detector being proportional to the intensity of the radiation effective in exposing the Roentgen film, said detector including a fluorescent screen and a photoelectric cell disposed to receive the light rays emitted by said screen, occulting means associated with said detector for varying the radiation incident upon the surface of the screen, said means including a rotatably mounted disc and a series of lead stops carried by said disc and formed with apertures in registration with correspondingly dimensioned openings in said disc, said disc being operable to dispose the respective stops in operative relation with respect to said screen and additional means coacting with and controlled by said disc for adjusting the response of said photoelectric cell in accordance with the variation of incident radiation.

4. A radiation responsive system adapted to be used in connection with an apparatus for automatically taking Roentgenographs of proper exposure comprising in combination a source of Roentgen radiation, a radiation detector positioned to receive the radiation after it traverses the Roentgen film, the response of said detector being proportional to the intensity of the radiation effective in exposing the Roentgen film, said detector including a fluorescent screen and a photoelectric cell disposed to receive the light rays emitted by said screen, occulting means associated with said detector for varying the radiation incident upon the surface of said screen, said occulting means embodying a manually operable disc and a plurality of stops mounted upon the upper surface of said disc, the respective stops being formed with apertures differing in number and in dimensions and adapted to be selectively disposed in operative relation with respect to said screen, the apertures in the stops registering with similarly dimensioned openings formed in the underlying disc and additional means coacting with and operated by said occulting means for adjusting the response of said photoelectric cell in accordance with the variation of incident radiation.

5. A radiation responsive system adapted to be used in connection with an apparatus for automatically taking Roentgenographs of proper exposure comprising in combination a source of Roentgen radiation, a grid mounting disposed beneath said source of radiation, a reciprocatory grid carried by said mounting, a Roentgen film support beneath said grid, said support being formed with an aperture for the passage of radiation, a radiation detector underlying the said Roentgen film support and adapted to receive radiation after it traverses the Roentgen film, the response of said detector being proportional to the intensity of the radiation effective in exposing said Roentgen film, said detector including a fluorescent screen and a photoelectric cell mounted to receive the light emitted by said screen, occulting means associated with said detector for varying the radiation incident at the surface of the screen, said means including a series of stops adapted to be interposed between the film support and the screen and additional means coacting with and controlled by said occulting means for adjusting the response of said photoelectric cell in accordance with variation of incident radiation effected by said occulting means.

6. A radiation responsive system adapted to be used in connection with an apparatus for automatically taking Roentgenographs of proper exposure comprising in combination a source of Roentgen radiation, a grid mounting disposed beneath said source of radiation, a reciprocatory grid carried by said mounting, a Roentgen film support beneath said grid, said support being formed with an aperture for the passage of radiation, a radiation detector underlying said Roentgen film support and adapted to receive radiation after it traverses the film, the response of said detector being proportional to the intensity of the radiation effective in exposing a Roentgen film, said detector embodying a housing, a photoelectric cell within said housing, a fluorescent screen positioned within said housing and reflector means positioned beneath said screen so that said photoelectric cell will receive a mirrored image of the screen, occulting means associated with said detector for varying the radiation incident upon the surface of said screen, said means including a plurality of stops adapted to be selectively secured in operative position above the screen and immediately below the opening in said film support and additional means coacting with and controlled by said occulting means for adjusting the response of said photoelectric cell in accordance with the variation of incident radiation effected by said stops.

RUSSELL H. MORGAN.
PAUL C. HODGES.

REFERENCES CITED

The following references are of record in the file of this patent:

UNITED STATES PATENTS

| Number | Name | Date |
|---|---|---|
| 581,199 | Easton | Apr. 20, 1897 |
| 1,531,620 | Meyer | Mar. 21, 1925 |
| 2,401,289 | Morgan et al. | May 28, 1946 |